United States Patent [19]

Ueno

[11] Patent Number: 5,061,992
[45] Date of Patent: Oct. 29, 1991

[54] TV PHONE COMMUNICATION SYSTEM AND APPARATUS THEREFOR

[75] Inventor: Hideyuki Ueno, Kanagawa, Japan

[73] Assignee: Kabushiki Kaisha Toshiba, Kanagawa, Japan

[21] Appl. No.: 468,502

[22] Filed: Jan. 23, 1990

[30] Foreign Application Priority Data

Jan. 24, 1989 [JP] Japan .................................. 1-013172

[51] Int. Cl.$^5$ ............................................. H04N 1/42
[52] U.S. Cl. ...................................... 379/53; 358/85
[58] Field of Search .................. 379/53, 54, 142, 215; 358/85

[56] References Cited

U.S. PATENT DOCUMENTS 3,946,158  3/1976  Leclercq et al. ...................... 379/53
4,242,539 12/1980  Hashimoto ........................... 379/142
4,813,070  3/1989  Humphreys et al. ............... 379/213
4,882,743 11/1989  Mahmoud ............................. 379/53

OTHER PUBLICATIONS

Telecom-Report, vol. 10, Sep./Oct. 1987.

Primary Examiner—Jin F. Ng
Assistant Examiner—Ahmad F. Matar
Attorney, Agent, or Firm—Finnegan, Henderson, Farabow, Garrett and Dunner

[57] ABSTRACT

A TV phone communication system is provided in which the communication between two parties can be maintained without interruption when a third party has made a call to one of the two parties. Specifically, one of the two parties can communicate with the third party without causing the other of the two parties to recognize the presence of the third party.

10 Claims, 14 Drawing Sheets

| STATE OF FIG. A | | SEL. NO. | | | | | | | |
| --- | --- | --- | --- | --- | --- | --- | --- | --- | --- |
| | (A) | (1) | (2) | (3) | (4) | (5) | (6) | (7) | (8) |
| (B) I/F 1 ON, I/F 2 OFF | | U | U | U | U | X | X | X | X |
| (C) I/F 2 CHANGE-OVER RECEPTION | | U | X | U | U | X | U | D | D |
| (C) I/F 1 ON, I/F 2 ON | | X | X | D | D | U | U | U | U |
| THREE-PARTY SIMULTANEOUS COMMUNICATION | | | | | | | | | |
| (C) I/F 1 ON, I/F 2 ON | | U/D | U/D | U | U | D/U | D/U | U | U |
| I/F 1 DISCONNECTED | | | | | | | | | |
| (D) I/F 1 OFF, I/F 2 ON | | X | X | X | X | U | U | U | U |
| (E) I/F 1 ON, I/F 2 OFF | | U | U | U | U | X | X | X | X |
| I/F 2 DISCON. | | | | | | | | | |
| (C) I/F 1 ON, I/F 2 CHANGEOVER | | U | U | U | U | X | X | D | D |
| (C) I/F 1 RECEPTION | | X | U | D | D | U | X | U | U |
| (G) I/F 1 OFF, I/F 2 ON | | X | X | X | X | U | U | U | U |

[
U: UPPER SIDE OF SEL. IN FIG. B IS CONNECTED
D: LOWER SIDE OF SEL. IN FIG. B IS CONNECTED
X: NEITHER OUTPUT NOR INPUT IS PRESENT (I.E., OFF)
]

FIG. 9

TV PHONE COMMUNICATION SYSTEM AND APPARATUS THEREFOR

BACKGROUND OF THE INVENTION

1. Field of the Invention

This invention relates to a TV phone communication system and an apparatus therefor.

2. Description of the Prior Art

In recent years, so-called TV phone systems have been widely used. In these systems, users at both ends of the line can communicate with each other while watching each other's face. However, the functions of such TV phone apparatus are limited in that users can watch only the face of the other party to the call. Thus, the functions of the TV phone apparatus are, in a sense, substantially the same as those of a conventional telephone. Specifically, when a third party has made a call to one of two users who are in communication, such a call can be recognized as in a conventional telephone. Further, in a so-called TV catch-phone system, the communication between the first and second users can be interrupted and held so as to allow the called user to communicate with a third party who has made a call to that user. However, the user that received such a call never can know who the third party is unless the called user makes a normal communication with the third party. In other words, the called user does not know whether he (or she) wishes to speak to the third party instead of the user he (or she) is speaking with when such a call is received. As a result, a TV phone apparatus has not been utilized effectively despite its possession of functions much superior to a conventional telephone.

As described above, in a conventional TV phone apparatus, when a third party has made a call to a user while that user is with another user, the called user can recognize the presence of such a call. However, the called user does not know who the third party is at the time the call is received.

SUMMARY OF THE INVENTION

Accordingly, one object of this invention is to provide a TV phone communication system and an apparatus therefor, in which the called user (the second user) can view the third party without interrupting his (or her) communication with another (the first user).

Briefly, in accordance with one aspect of this invention, there is provided a communication system using a plurality of TV phone apparatus, each having a displaying device for displaying images of communicating parties and speech communication devices for communicating with the parties, the communication system comprising apparatus for communicating between a first communicating party and a second communicating party by use of the displaying devices and speech communication devices, and third party displaying devices for displaying an image of a third communicating party on the displaying device in the TV phone apparatus of the second party without interrupting the communication between the first party and the second party when the third party has made a call to the second party during the communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a diagram illustrating the transition and the changeover in the operation of the third embodiment shown in FIG. 7;

DESCRIPTION OF THE PREFERRED EMBODIMENTS

Figure 1:
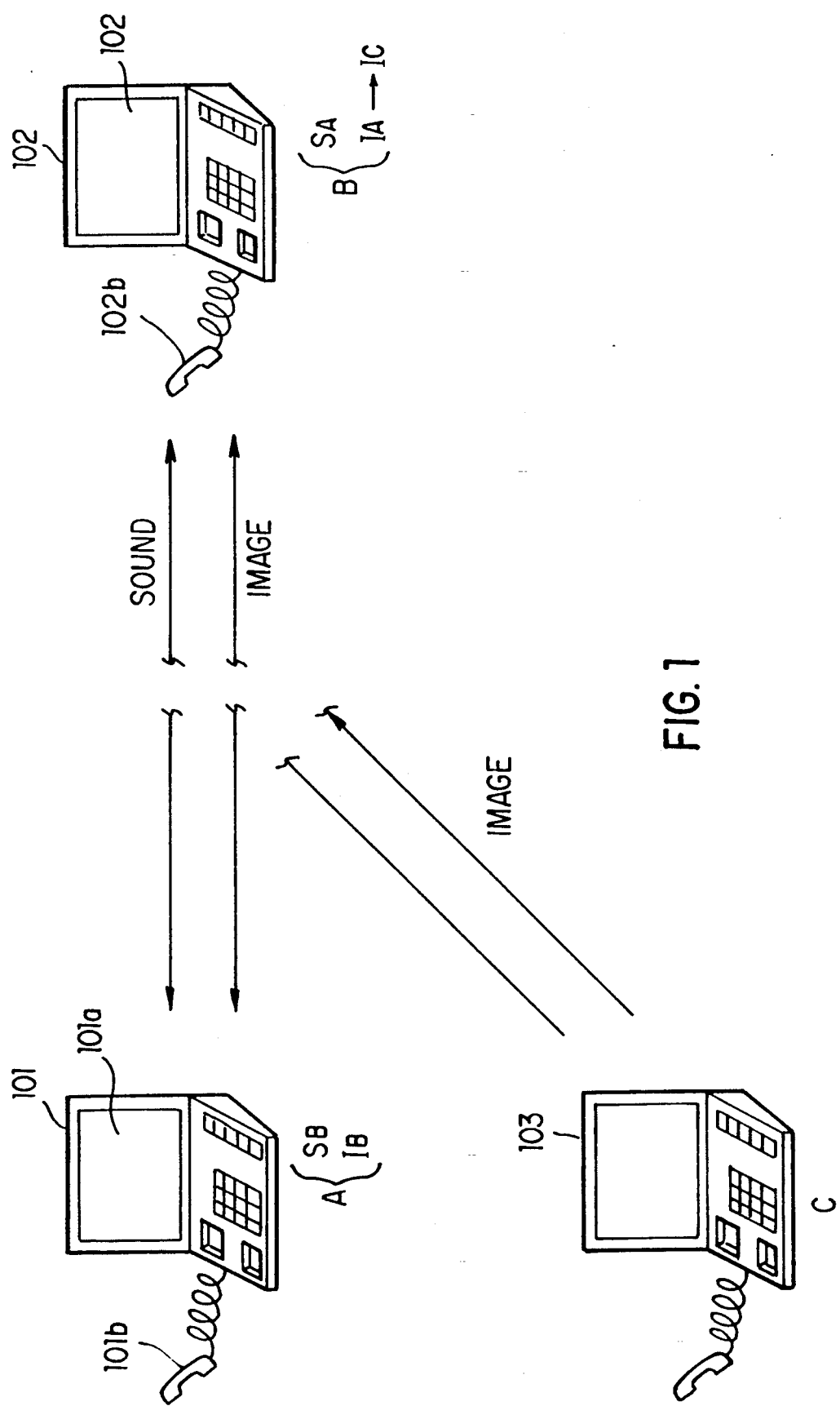
FIG. 1 is a diagram for explaining the general concept of the present invention.

Referring now to the drawings, wherein like reference numerals designate identical or corresponding parts throughout the several views, and more particularly to FIG. 1 thereof, a first embodiment of this invention will be described.

First a general concept of this invention will be described with reference to FIG. 1. Here, assume that a user A of a TV phone apparatus 101 is speaking over the line to a user B of a TV phone apparatus 102. In the case of a conventional TV phone apparatus, a sound signal $S_A$ and an image signal $I_A$, which represent the sound and image of the user A, are sent to a receiver 102b and a display 102a of the apparatus 102, respectively. Further, a sound signal $S_B$ and an image signal $I_B$, which represent the sound and image of the user B, are sent to a receiver 101b and a display 101a of the apparatus 101, respectively. If a third party C makes a phone call to the user B, the user B could recognize the presence of this call by an LED-blinking, a bell-ringing, or the like. However, the user B will not know who is calling. The user B could hold the communication with the user A, and make contact with the party C by answering the call. In this case, user A might be unhappy because of this interruption. When the third party C is a person who user B desires to speak with immediately, such an interruption may be inevitable. However, when the third party C is a person who user B does not wish to speak to immediately, it would be better for user B to continue the communication with the user A without interruption.

In this invention, user B can receive an image signal $I_C$ that represents the image of the third party C, and recognize who is calling. Thus, user B can then judge, while continuing to speak to user A, whether to continue the communication with user A, or to immediately hang up and take the call from the third party C. Moreover, the user A does not recognize the presence of the third party C because there is no change in the sound signal $S_B$ and image signal $I_B$ produced by the apparatus 102.

Figure 2:
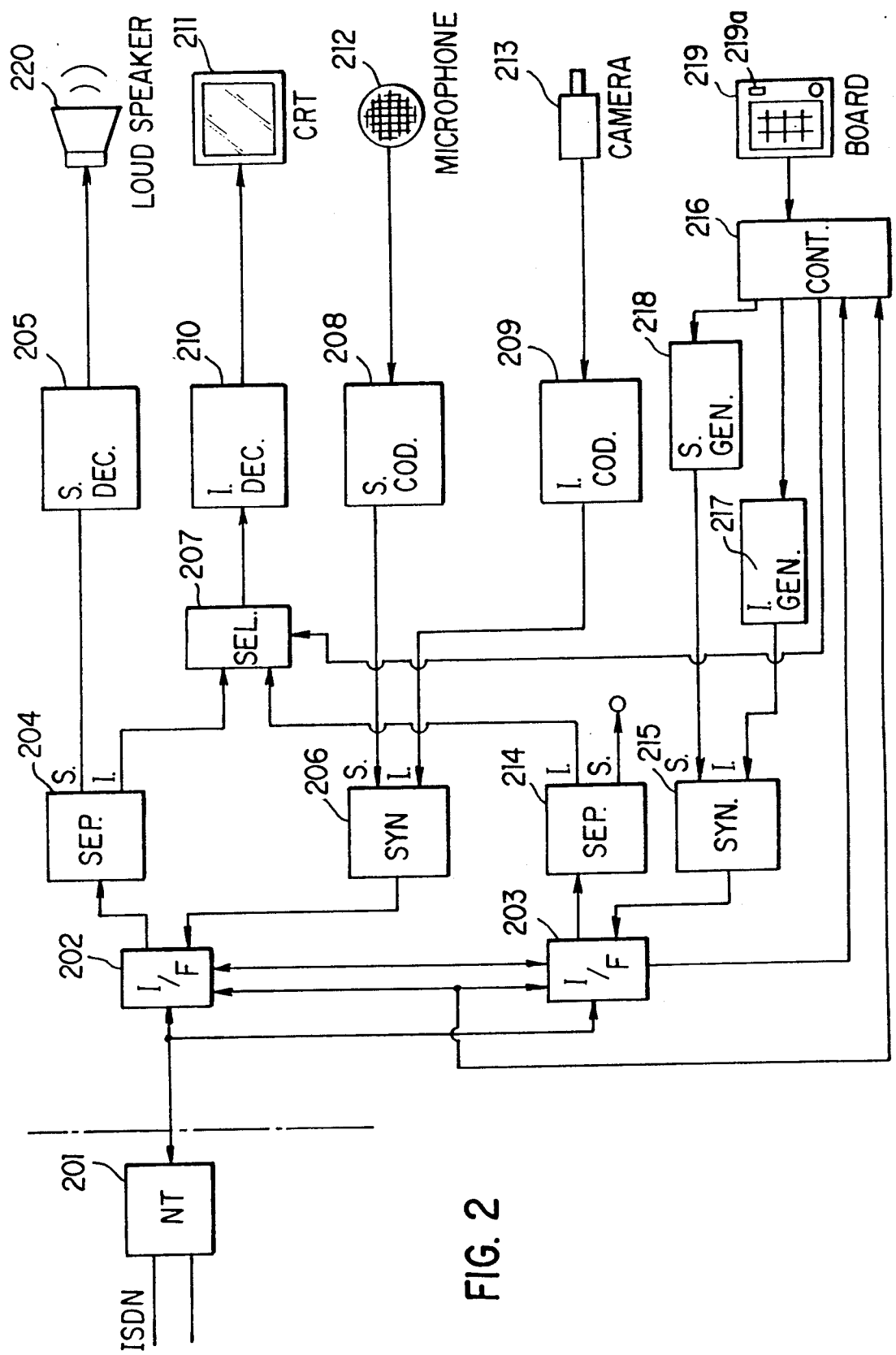
FIG. 2 is a block diagram illustrating a first embodiment according to the present invention.

Hereinafter, the advantages of this invention will be described in detail. FIG. 2 is a block diagram illustrating a first embodiment of a TV phone apparatus according to the present invention. The block diagram of FIG. 2 corresponds to the TV phone apparatus 102 of FIG. 1. In FIG. 2, two line interfaces 202 and 203 are connected to a line terminal circuit 201 of an ISDN (integrated services digital network) in a bus fashion. The interfaces 202 and 203 operate depending on the states of each other. Specifically, when the interface (hereinafter simply referred to as I/F) 202 is not in communication, the I/F 203 is not ready to receive a call. In other words, only while the I/F 202 is in communication will the I/F 203 be enabled to receive a call. This control is made by a control circuit 216. The I/F 202 and I/F 203 are provided with a single common sub-address.

Further, in this embodiment, image signals and sound signals are multiplexed in a range of 64 kbps × n (e.g., an image signal of 48 kbps + a sound signal of 16 kbps, or an image signal of 100 kbps + a sound signal of 28 kbps etc.). Separation circuits 204 and 214 respectively separate the multiplexed signals into image signals I and sound signals S. Assume that neither circuit 202 or 203 are in operation, and a call from the user A of FIG. 1 is received. The I/F 203 is not ready to receive this call. Thus, the I/F 202 receives this call instead. As a result, a multiplexed signal of image and sound is fed into the separation circuit 204 through the I/F 202. After the reception of this call, the I/F 202 feeds a signal to the control circuit 216 to enable the I/F 203 to be ready for a subsequent call.

The separation circuit 204 separates the received multiplexed signal into an image signal I and a sound signal S. The thus separated image signal I is fed into a selection circuit 207, and the separated sound signal S is fed into a sound decoding circuit 205. The circuit 205 is connected to a loud speaker 220 so as to reproduce the sound of the user A. The selection circuit 207 selects a circuit that connects the separation circuit 204 to an image decoding circuit 210 when the I/F 203 receives no call. The image decoding circuit 210 is connected to a CRT monitor 211 so as to reproduce the image of the user A. Further, the sound of the user B is converted by a microphone 212 into a sound signal which is, in turn, fed into a sound coding circuit 208. The image of the user B is converted by a TV camera 213 into an image signal which is, in turn, fed into an image coding circuit 209. The coded sound signal and the coded image signal are respectively produced from the circuits 208 and 209, and fed into a synthesizer circuit 206 so as to be synthesized therein. The thus synthesized signal is fed through the I/F 202 into the line terminal circuit 201. As a result, the communication between the users A and B can be performed with the TV phone apparatus. If no subsequent call occurs during the communication between the users A and B, the communication will be ended in accordance with a normal procedure.

Next, assume that a subsequent call from a third party C occurs during the communication between the users A and B. The I/F 202 cannot receive such a call because it is connected in communication. Instead, the I/F 203 receives the call from the third party C in the following manner. Specifically, when the I/F 203 receives the new call, it sends a signal that informs the control circuit 216 of this reception. The control circuit 216 then causes the selection circuit 207 to select a circuit that connects the separation circuit 214 to the image decoding circuit 210. Thus, the image signal I produced from the separation circuit 214 is fed into the image decoding circuit 210 through the selection circuit 207. The image signal I is decoded by the circuit 210, and fed into the CRT display 211. As a result, the image of the third party C can be reproduced on the CRT 211. The sound signal S produced from the separation circuit 214 is abandoned. Further, the control circuit 216 enables a coded image signal generating circuit 217 and a coded sound signal generating circuit 218. The circuit 217 generates a coded image signal based on character information determined by the input control board 219. The circuit 218 generates a coded sound signal on the basis of previously prepared sound information. Both the coded image and sound signals are used to inform the third party C that the users A and B are in communication.

Further, these signals are used to request the third party C to behave in such a manner as desired by the user B. In this case, a plurality of possible requirements for the third party C may be previously prepared, and the user B can select ones suitable for the state. These coded image and sound signals are synthesized by a synthesizer circuit 215, and fed into the line through the I/F 203. As described above, the user B can be informed of who is calling by watching the face image of the third party C without interrupting the communication with the user A. Moreover, this can be done without user A's knowledge. Further, the user B can request the third party C to behave as indicated by the character information.

The end of communication will be performed in the following manner. Specifically, when the communication of the I/F 203 ends earlier than the I/F 202, the control circuit 216 maintains the state that the I/F 203 is ready to receive a call. This state continues until a time at which the control circuit 216 receives a signal indicating that the communication of the I/F 202 has ended. In the case when the control circuit 216 initializes the selection circuit 207, the control circuit 216 confirms whether the I/F 203 is in communication. When the I/F 203 is not in communication, the control circuit 216 initializes the I/F 203, i.e., to the state unable to receive a call. Further, when the I/F 203 is in communication, the control circuit 216 awaits a signal indicating that the communication of the I/F 203 has ended. Assume that the control circuit 216 receives the communication-end signal from the I/F 203 when the I/F 202 is not in communication. The control circuit 216 then initializes the I/F 203, i.e., to the state unable to receive a call.

Moreover, the variations in terms of the CRT display can be easily achieved in the following manner. Specifically, two image decoding circuits equivalent to the image decoding circuit 210 are respectively provided after the separation circuits 204 and 214. As a result, an interruption image of the third party C can be obtained as a small image in the original image on the CRT display' 211.

Figure 3:
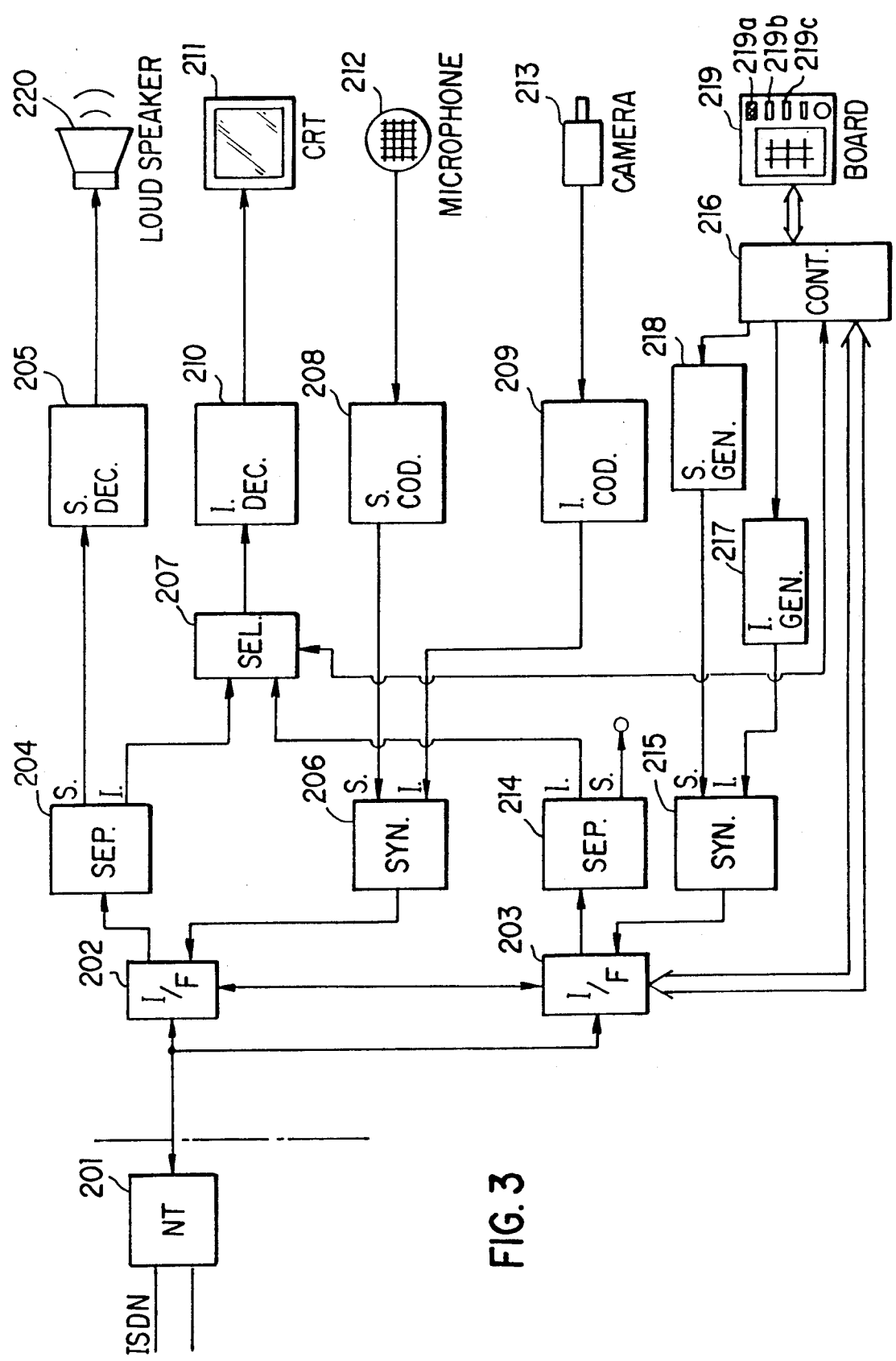
FIGS. 3 and 4 are block diagrams illustrating modifications of the first embodiment according to the present invention.

FIG. 3 shows a modification of the first embodiment. This differs from the apparatus of FIG. 2 in the following ways. Specifically, when an I/F 203 receives a call from the third party C, a calling signal is fed into a board 219 through a control circuit 216. The board 219 then informs the user B of the presence of the call by lighting a lamp 219b. Further, a switch 219c on the board 219 serves to cause a selection circuit 207 to select a circuit that connects a separation circuit 214 to an image decoding circuit 210.

Figure 4:
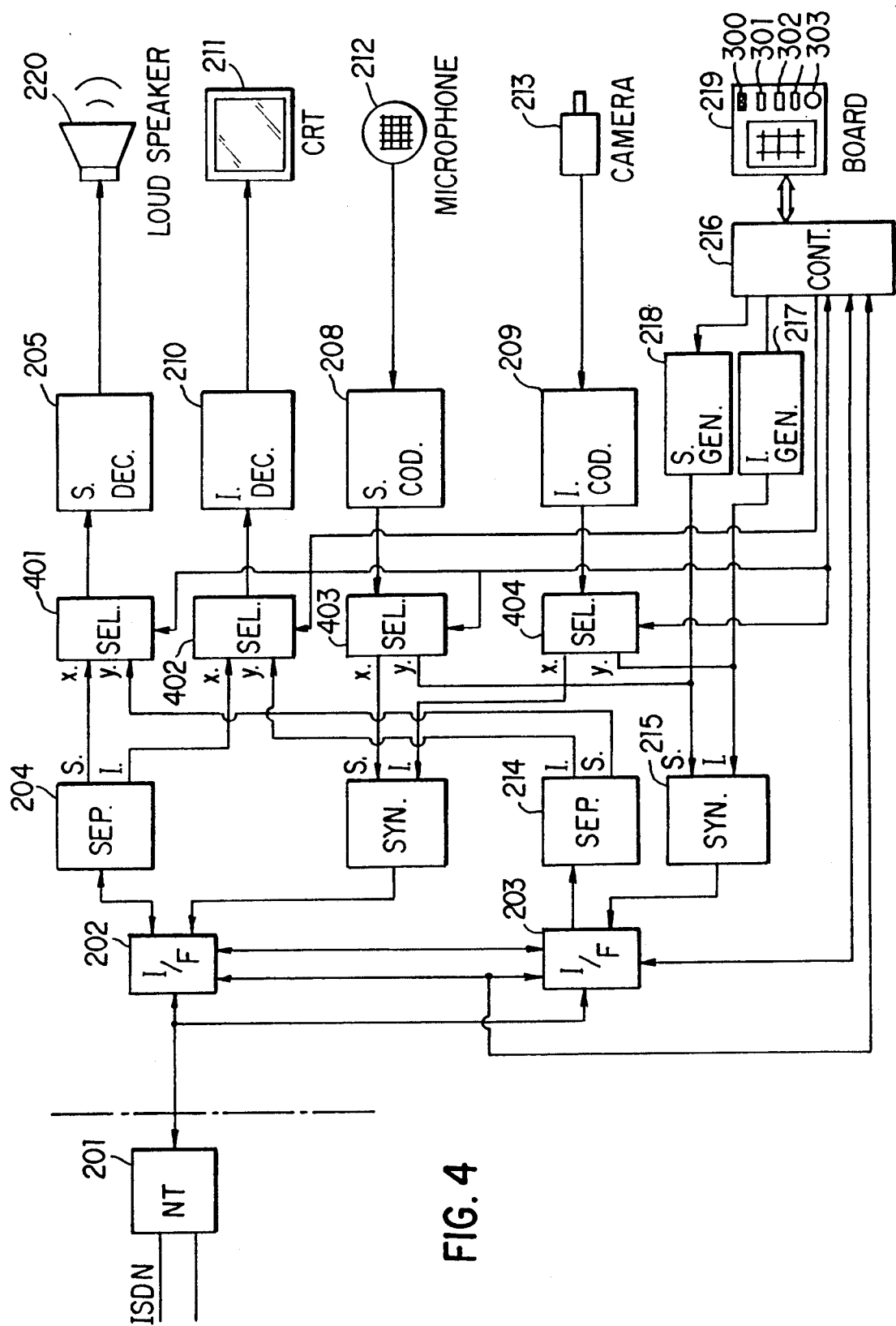

FIG. 4 shows another modification of the first embodiment. This differs from the apparatus of FIG. 2 in the following ways. Specifically, during the communication of the users A and B, the user B can switch into a normal communication with the third party C if required. This can be done immediately after the viewing of the face image of the third party C. Hereinafter, the operation of the apparatus of FIG. 4 will be described in detail with reference to flow charts of FIGS. 5a and 5b. First, assume that the user B is in communication with the user A. The apparatus has four selection circuits 401 through 404, each of which has selected each circuit connected to an X side.

Thus, an image signal I and a sound signal S can be normally sent and received between the users A and B. A control circuit 216 continuously monitors the states of I/F 202, I/F 203 and the selection circuits 401 through 404. Next, assume that the I/F 203 receives a call from the third party C during the communication between the users A and B. The I/F 203 feeds the calling signal to the control circuit 216 (STEP 1 of FIG. 5a). The control circuit 216 then causes a lamp 300 provided on a board 219 to blink on and off (STEP 2 of FIG. 5a). The user B is informed of the call, and can select whether to continue the communication with the user A. When the user B operates a switch 301 on the control board 219, the board 219 feeds a switching signal to the control circuit 216.

Figure 5:
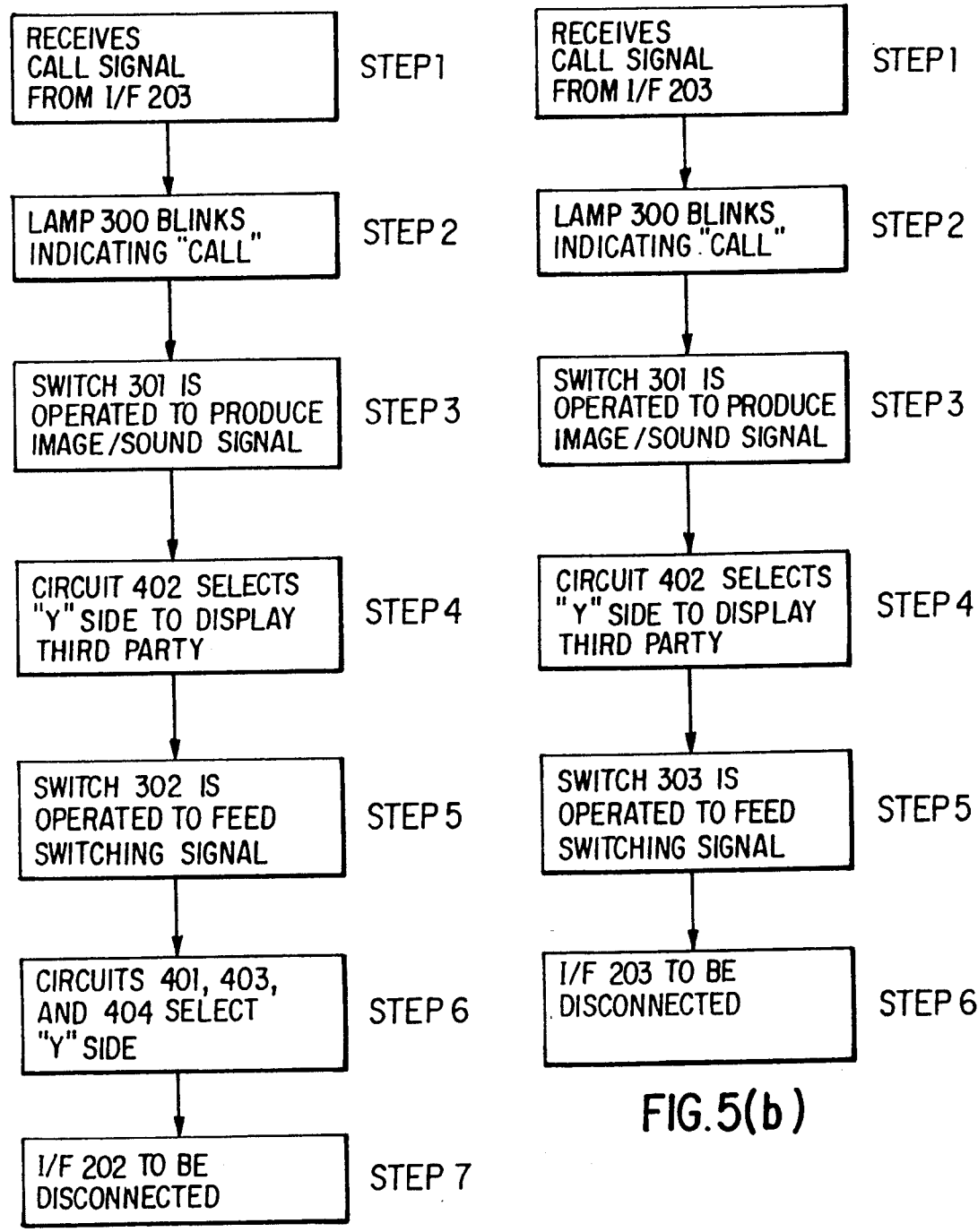
FIGS. 5a–5b is a flow chart for explaining the operation of a control circuit shown in FIG. 4.

Thus, the control circuit 216 causes a coded image signal generating circuit 217 and a coded sound signal generating circuit 218 to produce a message of image/sound saying "Please wait for a few seconds" (STEP 3 of FIG. 5a). Further, the control circuit 216 causes only the selection circuit 402 to select a circuit connected to a Y side. Thus, the face image of the third party C is fed into a CRT display 211 through the I/F 203, a separation circuit 214 and an image decoding circuit 210. As a result, the face image of the third party C is displayed without interrupting the communication between the users A and B (STEP 4 of FIG. 5a). In the case when the user B desires to make a normal communication with the third party C, the user B operates a switch 302 on the board 219 so as to feed a switching signal to the control circuit 216 (STEP 5 of FIG. 5a). The control circuit 216 then causes the selection circuits 401, 403 and 404 to respectively select circuit connected to Y sides (STEP 6 of FIG. 5a). Further, the control circuit 216 causes the I/F 202 to be disconnected from a line terminal circuit 201 of ISDN, i.e., the communication with the user A is ended (STEP 7 of FIG. 5a).

In the case when the user B does not desire to communicate with the third party C, the user B operates a switch 303 on the board 219 so as to feed a switching signal to the control circuit 216 (STEP 5 of FIG. 5a). Prior to the disconnection of the I/F 203, the coded image signal generating circuit 217 and the coded sound signal generating circuit 218 produce a message of image/sound saying "The line is busy now, and I'll call you back later" or "Please call me later". Thereafter, the control circuit 216 causes the I/F 203 to be disconnected from the line terminal circuit 201 of ISDN (STEP 6 of FIG. 5b).

In the above description, the image of the third party C is a moving image. However, such a image may also be a still image of a single frame obtained from a frame memory and the like.

Figure 6:
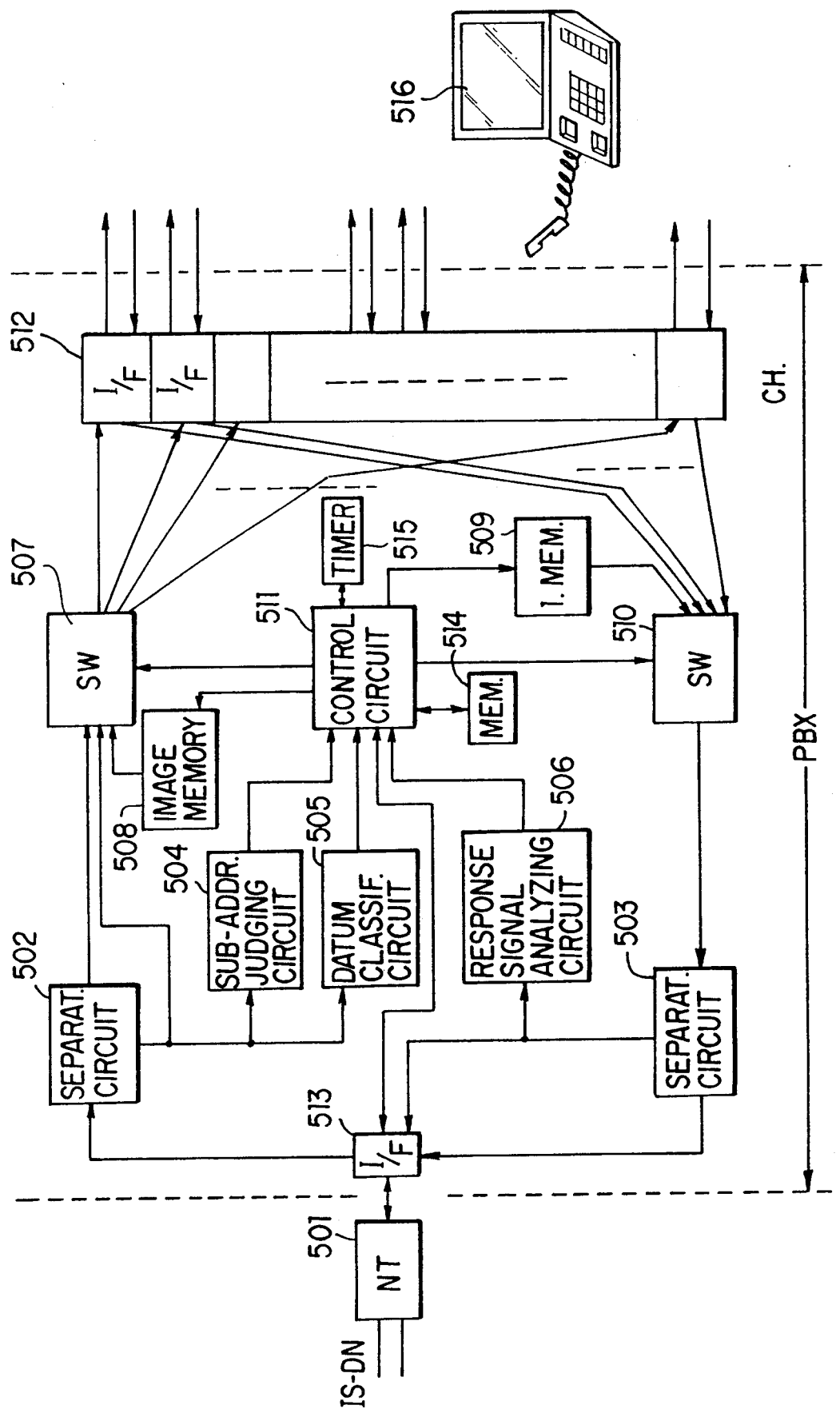
FIG. 6 is a block diagram illustrating a second embodiment according to the present invention.

Next, a second embodiment according to the present invention will be described with reference to FIG. 6. In FIG. 6, a PBX (private branch exchange) for TV phone apparatus is illustrated. FIG. 6 shows only an essential portion of the PBX, which comprises a line interface 513, a signal receiving system and a signal transmitting system. A signal received from a line terminal circuit 501 of ISDN is fed into a separation circuit 502 through an I/F 513. The circuit 502 separates the received signal into a control signal and a datum signal. The control signal is fed into a sub-address judging circuit 504 and a datum classifying circuit 505. The circuits 504 and 505 extract and read sub-addresses and matching-confirming information, and feed the same into a control circuit 511. The control circuit 511 then feeds sub-address information to a timesharing switch 507.

Further, the control signal and the datum signal produced from the circuit 502 are separately fed into the timesharing switch 507. In accordance with the instructions produced from the control circuit 511, the control signal and the datum signal are fed into the respective channels 512 (I/Fs) corresponding to the designated sub-addresses. A response signal, which is produced from a TV phone apparatus 516 connected to one of the channel 512 (I/Fs) corresponding to the designated sub-address, is fed into a separation circuit 503 through a switching circuit 510. The separation circuit 503 separates the response signal into a control signal and a datum signal. The control signal is fed into a response signal analyzing circuit 506. When the designated sub-address is not busy, i.e., the matching has been confirmed, the circuit 506 produces a call signal and feeds the same into the control circuit 511. Here, the datum signal produced from the TV phone apparatus 516 is stored in a memory 514. The memory 514 is cleared each time the call signal is utilized. When the designated sub-address is busy, i.e., the matching cannot be confirmed, the response signal analyzing circuit 506 feeds a signal, which represents the completion of the analysis, into the control circuit 511.

In this case, the control circuit 511 refers to the memory 514. When the content of the memory 514 has been cleared, the control circuit 511 judges the line as mismatched. Assume that the content of the memory 514 is not a desired image datum signal. The control circuit 511 then sends a signal informing the transmitter party of the busy line through the I/F 513. Further, assume that the content of the memory 514 is a desired image datum signal. The control circuit 511 then enables the memory 508 to feed the content thereof into the timesharing switch 507. At the same time, the control circuit 511 feeds a control signal to the switch 507. The switch 507 then switches a datum signal, which is received from the separation circuit 502, to a signal which is received from the image memory 508. The switch 520 remains in the previous state with no change. The content of the image memory 508 is a coded datum signal which informs the receiver party that a transmitter party desires to be connected. The coded datum signal urges the receiver party to input a response signal, which may be obtained by use of a dial signal. The control circuit 511 also starts a timer 615 so as to measure time in waiting for the response signal.

If the response signal cannot be obtained within a prescribed time, the control circuit 511 feeds a signal to the transmitter party through the I/F 513 informing of the busy line. When the response signal is obtained, the response signal is fed through the response analyzing circuit 506 into the control circuit 511. Upon the reception of the response signal, the control circuit 51 enables the image memory 509 to feed the content thereof into the switch 510. At the same time, the control circuit 511 feeds a control signal to the switch 510. The switch 510 then switches a signal which is received from the channel 512 to a signal which is received from the image memory 509.

Further, the control circuit 511 starts the timer 515, and feeds a control signal into the timesharing switch 507. The switch 507 switches the image signal of the earlier calling party to the image signal of the later calling party. After a prescribed time has elapsed, the control circuit 511 again enables the image memory 508 to feed the content thereof into the switch 507. The control circuit 511 further feeds a control signal into the switch 507. The switch 507 then switches the image signal of the later calling party to a signal which is received from the image memory 508. Thus, the control circuit 511 urges the receiver party to feed a response signal. The receiver party then feeds the response signal by use of a dial in the following manner.

Specifically, the number of the dial corresponds to each of image signals stored in the image memory 509. Each of image signals represents what the receiver party desires the transmitter party to do. For example, "0" corresponds to "the line is busy", and "1" to "I'll call you back after x x minutes". Upon the switching of the switch 510, the control circuit 511 starts the timer 515 so as to measure time in waiting for the busy line. Assume that the line remains busy even after a predetermined time has elapsed. The control circuit 511 feeds a signal to the later calling party, which instructs the party to hang up. Thereafter, the communication with this party is stopped by the control circuit 511. Further, assume that the line becomes open within the predetermined time, and the call of the later calling party still continues. In this case, the control circuit 511 feeds a control signal into the switch 507 to make connection to the later calling party.

As described above, according to the present invention, there can be provided a TV phone apparatus wherein the communication between two parties can be maintained without interruption when a third party has made a call to one of the two parties. Specifically, one of the two parties can communicate with the third party without causing the other of the two parties to recognize the presence of the third party.

Next, a third embodiment according to the present invention will be described with reference to FIGS. 7 through 14. In this embodiment, users A, B and C can communicate simultaneously, and the priority order of interfaces I/F1 and I/F2 can be switched. In this embodiment, the interfaces I/F1 and I/F2 have structures identical to each other, and the communications of users A, B and C can be performed in three different modes; such as an I/F1-priority mode, an I/F2-priority mode (hereinafter, referred to as a normal mode), and three-party simultaneous communication mode. The changeover between the I/F1-priority mode and the I/F2-priority mode is determined depending on which call is first disconnected when both the I/F1 and the 1/F2 are in communication. Further, the changeover between the normal mode and the three-party simultaneous communication mode is performed in accordance with a control signal generated by the keyboard operation and the like.

Figure 7:
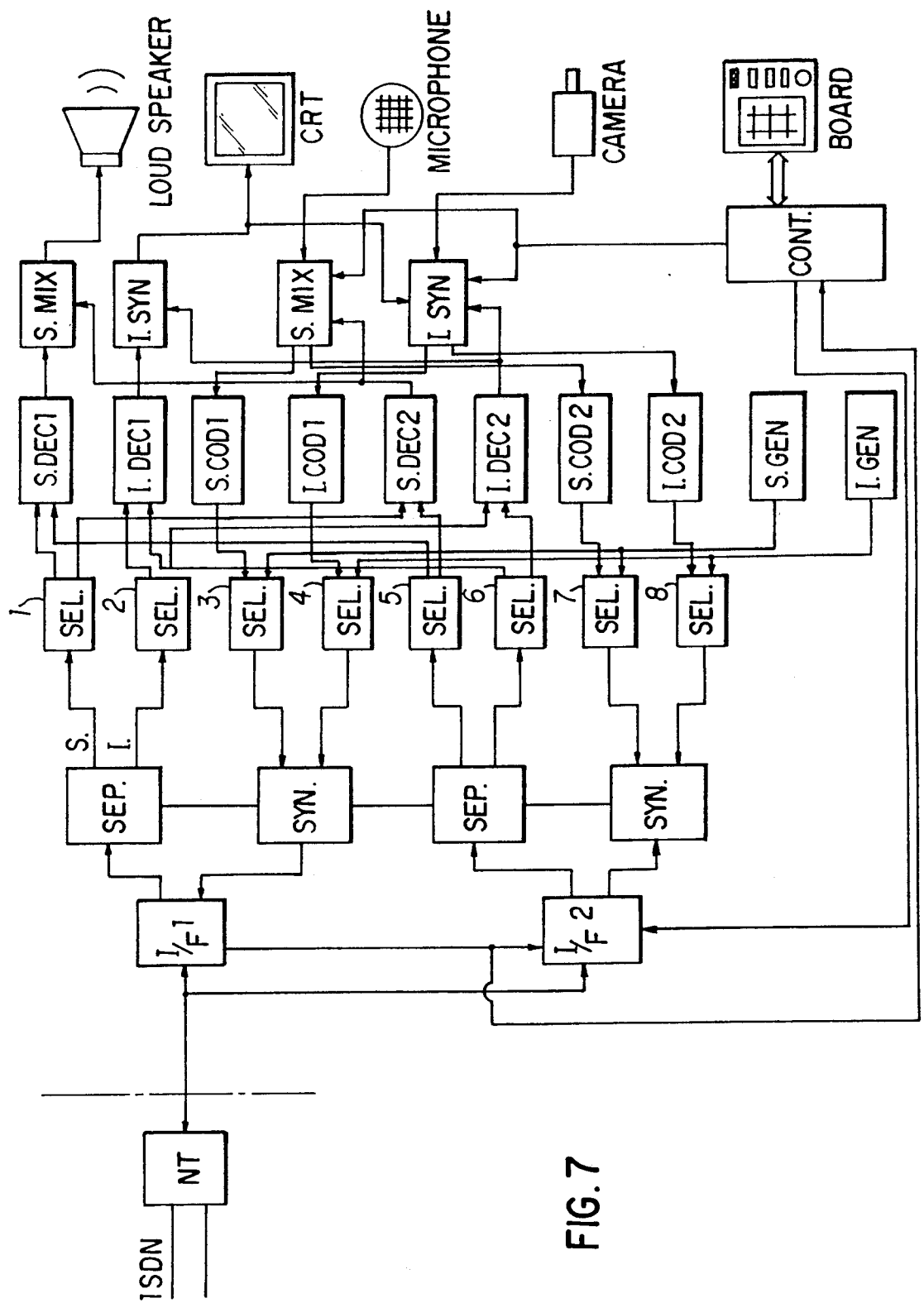
FIG. 7 is a circuit block diagram illustrating a third embodiment according to the present invention.
Figure 8:
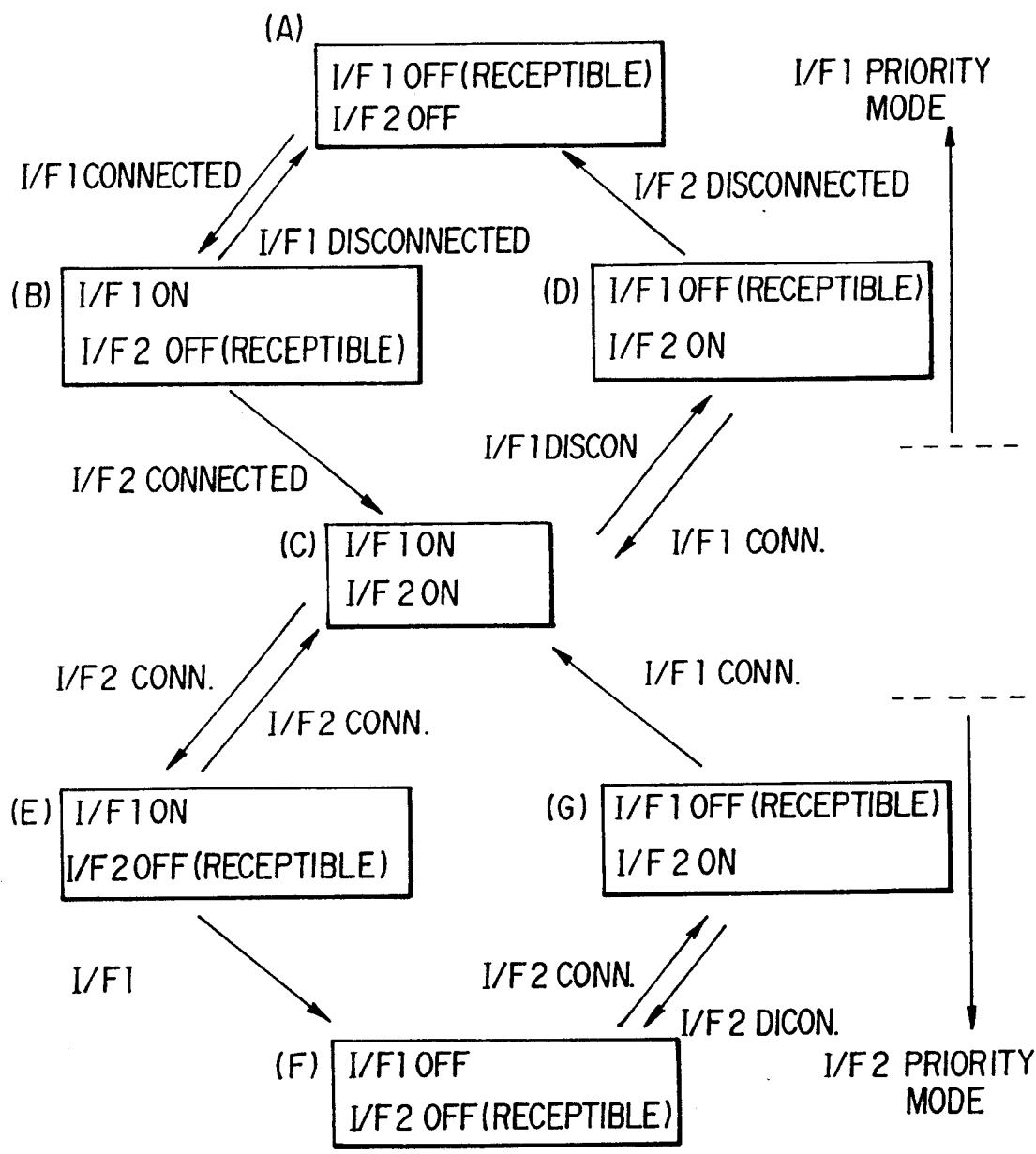
FIG. 8 is a block diagram illustrating the operation of the third embodiment shown in FIG. 7.
Figure 10:
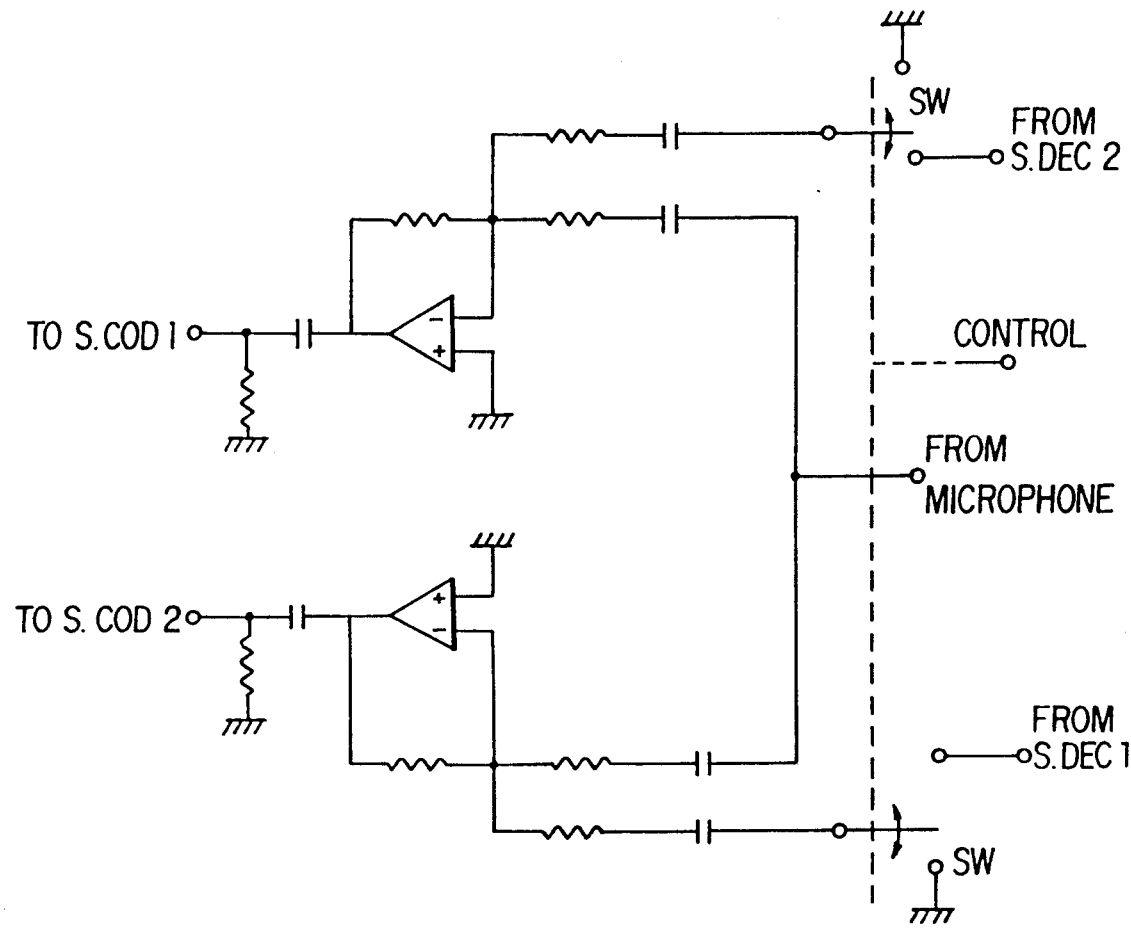
FIG. 10 is a circuit diagram specifically illustrating an essential portion of the third embodiment shown in FIG. 7.

FIG. 7 shows a circuit block diagram of this embodiment according to the present invention. In FIG. 7, selector circuits 1 through 8 select input/output signals simultaneously in accordance with a control signal. The selecting operations are performed on the basis of the state transition and the mode changeover of FIG. 8 in a prescribed manner, as shown in FIG. 9. FIG. 10 shows a specific example of sound mixers of FIG. 7. In the normal mode, a sound signal produced from the microphone is fed into an amplifier 1. The amplifier 1 then produces an output signal, which, in turn, is sent to the sound coding circuit 1 (S. cod 1 of FIG. 7), as shown in FIG. 10. In the three-party simultaneous communication mode, an output signal produced from the sound decoding circuit 1 (S. cod 1) and a sound signal produced from the microphone are fed into an amplifier 2. The amplifier 2 then synthesizes the thus received input signals, and produces an output signal, which, in turn, is sent to the sound coding circuit 2 (S. cod 2) of FIG. 7. Further, an output signal produced from the sound decoding circuit 2 (S. cod 2) and a sound signal produced from the microphone are fed into the amplifier 1. The amplifier 1 then synthesizes the thus received input signal, and produces an output signal, which, in turn, is sent to the sound coding circuit 1 (S. cod 1).

Figure 11:
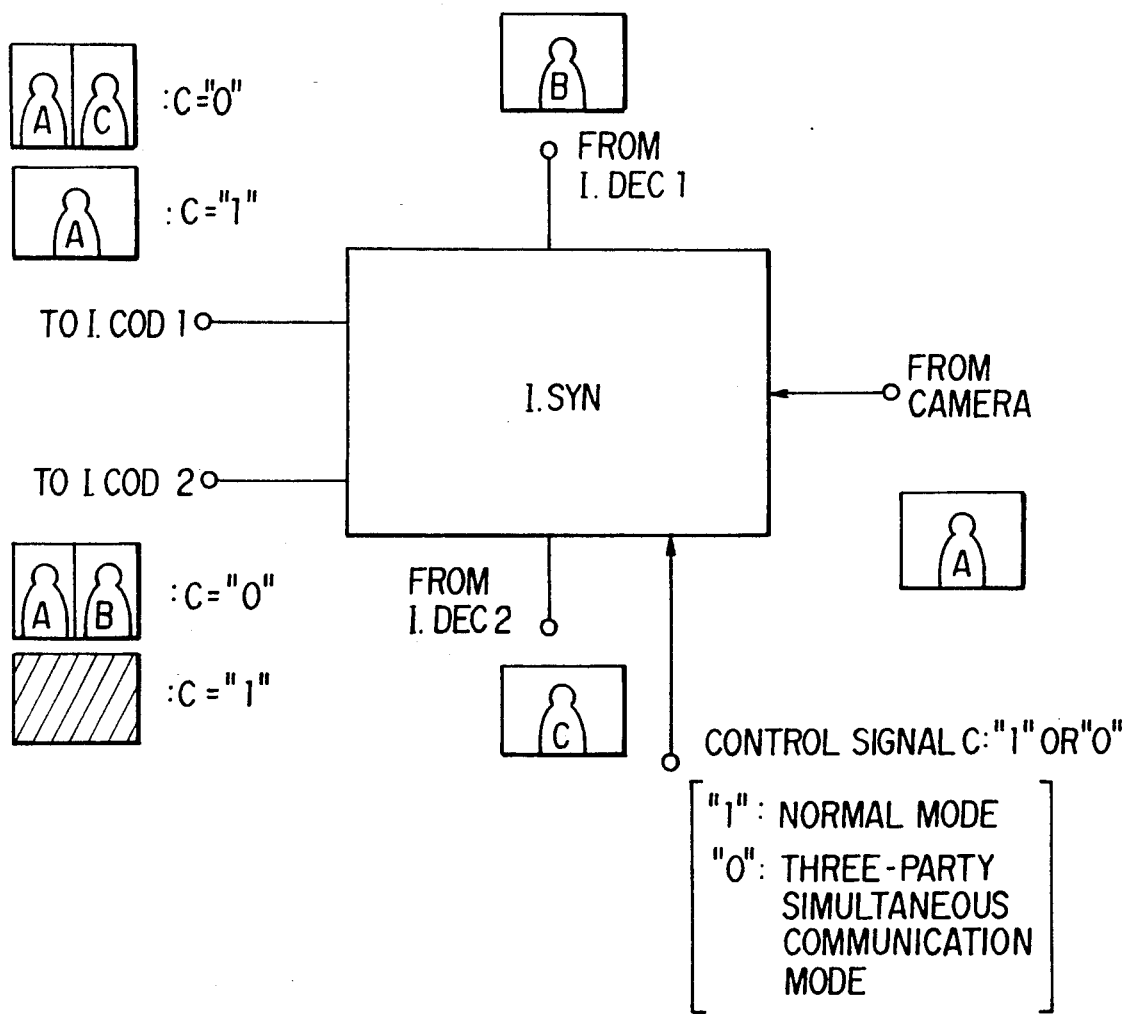
FIG. 11 is a block diagram illustrating the operation of the essential portion of the third embodiment shown in FIG. 7.

FIG. 11 is a diagram illustrating the operation of the image synthesizing circuit (I. syn) of FIG. 7. In the normal mode, an image signal produced from the camera is fed into the image synthesizing circuit (I. syn). This circuit then produces an output signal, which, in turn, is sent to the image coding circuit 1 (I. cod). In the three-party simultaneous communication mode, an image signal produced from the image decoding circuit 1 (I. dec 1) and an image signal produced from the camera are fed into the image synthesizing circuit (I. syn). This circuit then produces an output signal, which, in turn, is sent to the image coding circuit 2 (I. cod 2). Further, an image signal produced from the image decoding circuit 2 and an image signal produced from the camera are fed into the image synthesizing circuit (I. syn). This circuit then produces an output signal, which, in turn, is sent to the image coding circuit 1 (I. cod). The synthesis of image frames can be easily achieved by use of the frame memory in a so-called PCM technique.

Figure 12A:
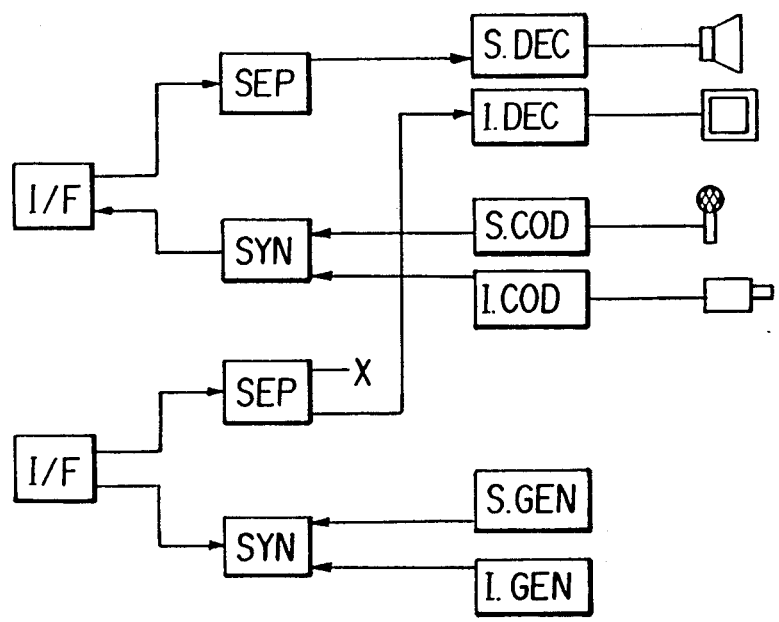
FIGS. 12A and 12B are circuit diagrams illustrating the essential portions of the third embodiment shown in FIG. 7.
Figure 12B:
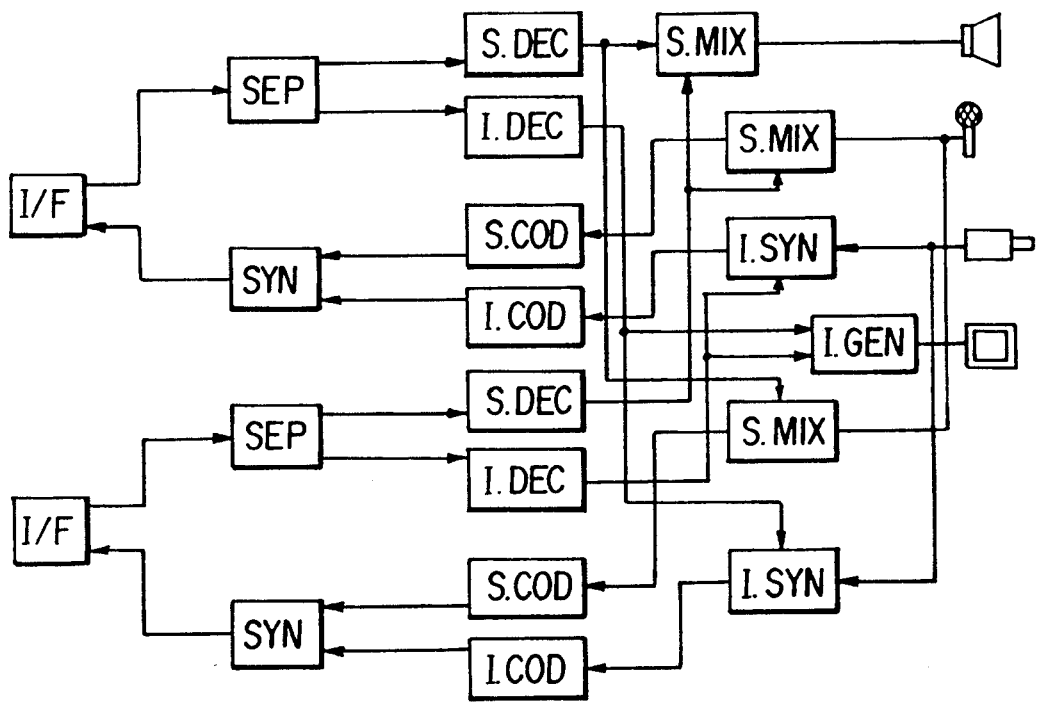
Figure 13:
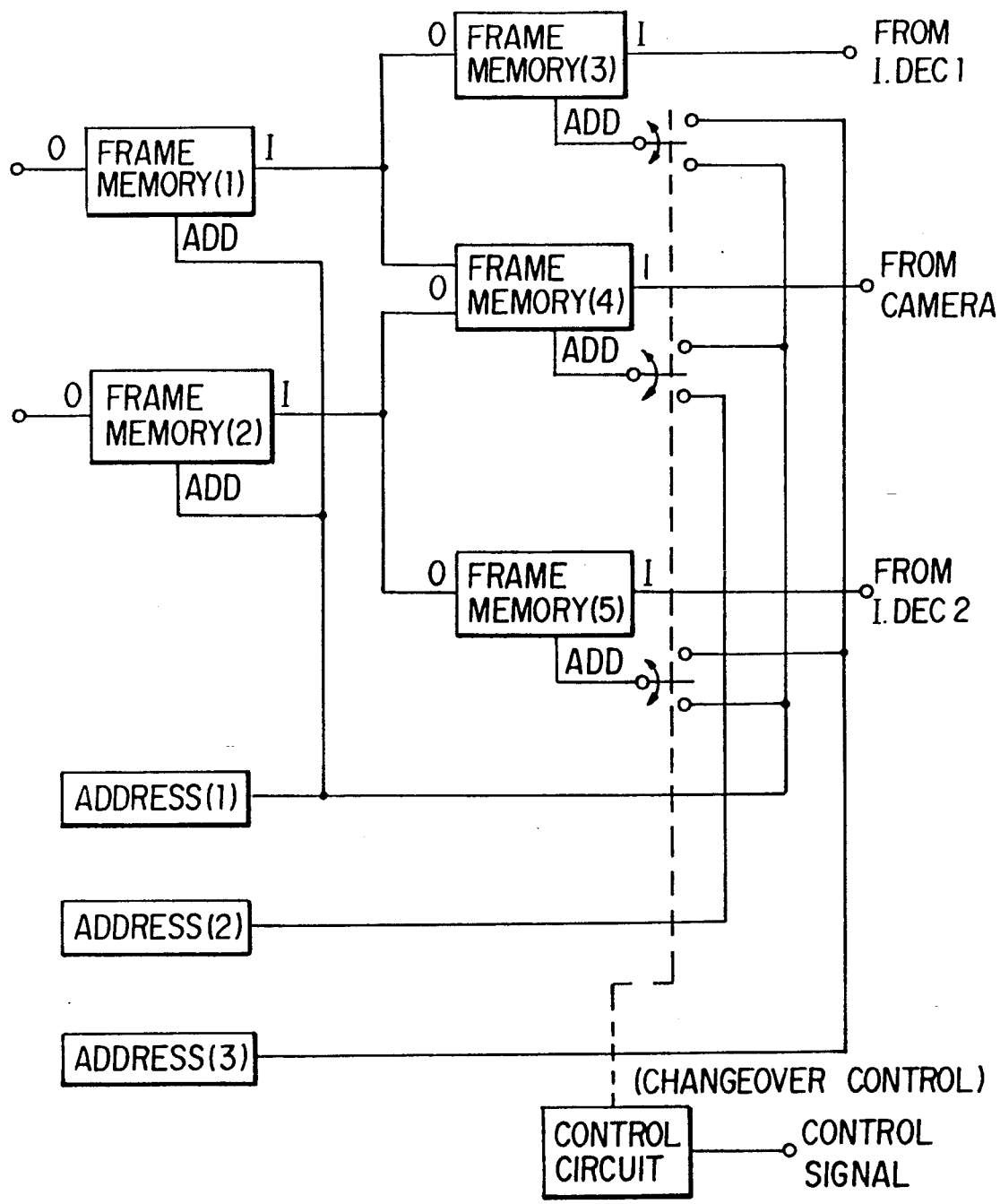
FIG. 13 is a circuit block diagram illustrating the essential portion of the third embodiment shown in FIG. 7.
Figure 14:
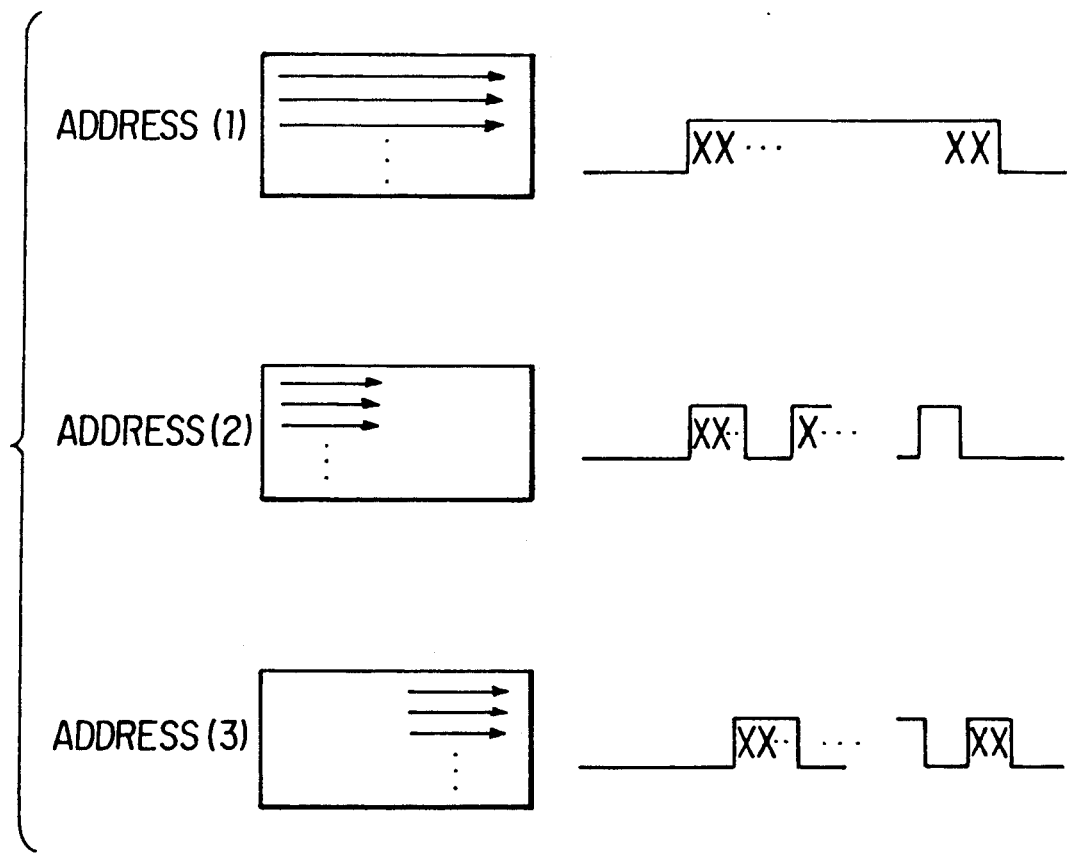
FIG. 14 is a diagram illustrating the operation of the third embodiment shown in FIG. 7.

FIGS. 12A and 12B show only the circuits which are operated in communication when both the I/F1 and the I/F2 are connected. Specifically, FIG. 12A shows the state in which the second call has been confirmed. FIG. 12B shows the state in which the three-party simultaneous communication mode is performed. FIG. 13 shows a specific configuration of the image synthesizing circuit of FIG. 7. FIG. 14 shows the raster states corresponding to addresses in the image synthesizing circuit in comparison with the respective time charts.

Obviously, numerous additional modifications and variations of the present invention are possible in light of the above teachings. It is therefore to be understood that within the scope of the appended claims, the invention may be practiced otherwise than as specifically described herein.

What is claimed is:

1. A communication system, comprising:
   a plurality of TV phone apparatuses each including
   a displaying device for displaying images of communicated parties, and
   speech communication means for communicating with said parties;
   at least one of said plurality of TV phone apparatuses including
   means for communicating between a first communicating party and a second communicating party by use of said displaying devices and speech communication means, and
   third party displaying means for displaying an image of a third communicating party on said displaying device in said TV phone apparatus of said second party without interrupting said communication between said first party and said second party when said third party has made a call to said second party during said communication.

2. The system of claim 1, wherein said third party displaying means includes image switching means for switching the image displayed on said displaying device of said second party from the image of said first party to the image of said third party.

3. The system of claim 1, wherein said third party displaying means includes means for incorporating the image of said third party into the image of said first party displayed on said displaying device.

4. The system of claim 1, further comprising means for displaying the image of said second party on the displaying device of said first party.

5. The system of claim 2, further comprising means for displaying the image of said second party on the displaying device of said first party.

6. The system of claim 3, further comprising means for displaying the image of said second party on the displaying device of said first party.

7. A TV phone apparatus, comprising:
   displaying means for displaying first and second communicating parties;
   speech communication means for communicating between said first and second communicating parties in speech;
   third party call detecting means for detecting a call from a third party during the display and speech communication of said first and second parties; and
   switching means for displaying said third party on said displaying means while maintaining the display and speech communication between said first and second parties.

8. The apparatus of claim 7, wherein said third party call detecting means includes third party call displaying means.

9. The apparatus of claim 8, wherein said third party call displaying means includes optical display means.

10. The apparatus of claim 8, wherein said third party call displaying means includes sound signal generating means.

* * * * *

UNITED STATES PATENT AND TRADEMARK OFFICE
CERTIFICATE OF CORRECTION

PATENT NO. : 5,061,992
DATED : October 29, 1991
INVENTOR(S) : Hideyuki Ueno

It is certified that error appears in the above-identified patent and that said Letters Patent is hereby corrected as shown below:

Claim 1, column 9, line 7, change "communicated" to --communicating--.

Claim 1, column 9, line 8, change "communicated" to --communicating--.

Signed and Sealed this

Fifteenth Day of June, 1993

Attest:

MICHAEL K. KIRK

*Attesting Officer*  *Acting Commissioner of Patents and Trademarks*